Oct. 4, 1960  F. A. DEAN ET AL  2,955,210
ALTERNATOR FREQUENCY CONTROL
Filed Feb. 12, 1958

FRANK A. DEAN
RICHARD T. ELLIS
THOMAS W. SHEPPARD
INVENTORS

BY
ATTORNEYS

United States Patent Office 2,955,210
Patented Oct. 4, 1960

2,955,210

ALTERNATOR FREQUENCY CONTROL

Frank A. Dean, Silver Spring, Richard T. Ellis, Clarkesville, and Thomas W. Sheppard, Silver Spring, Md., assignors to the United States of America as represented by the Secretary of the Navy Filed Feb. 12, 1958, Ser. No. 714,933

7 Claims. (Cl. 290—40)

The present invention relates to a system for regulating the frequency of an electrical power supply and in more particular to a frequency control system for a rotary alternator.

The principle of this invention is the fact that a closed loop hydraulic servo system when properly connected to drive an alternator will provide a method of shaft speed control which is extremely precise and very rapid in response.

A shortcoming of prior electrical power supplies is poor regulation of the alternator frequency under conditions of changing electrical load, and prime mover instability with changes in environment and the demand of other auxiliary systems.

Therefore, it is an object of the present invention to provide in an electrical power supply improved frequency stability under these adverse conditions.

Another object of this invention is to improve the regulation of the output voltage of the power supply by maintaining the alternator speed constant under these conditions.

Other objects and many of the attendant advantages of this invention will be readily appreciated as the same becomes better understood by reference to the following detailed description when considered in connection with the accompanying drawings, wherein.

Figure 1:
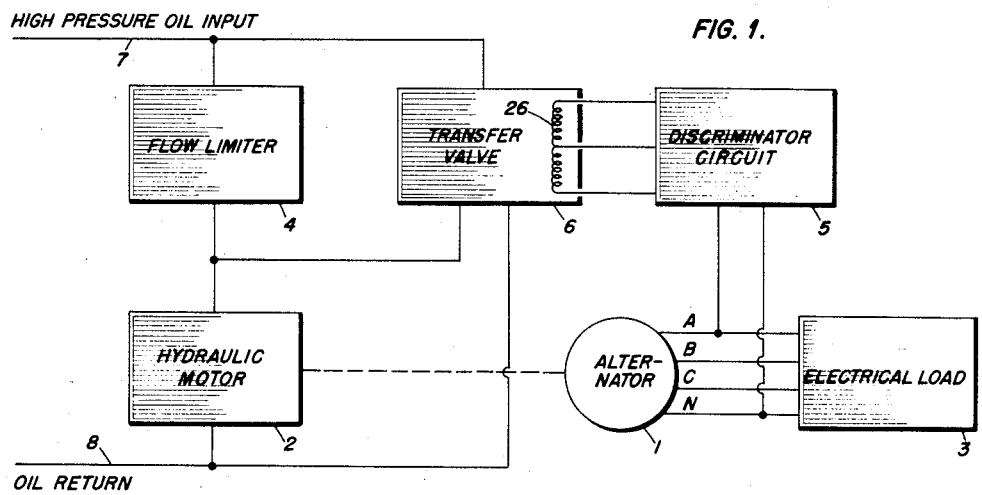
Fig. 1 is a block diagram of the alternator frequency control system.

Referring now to Fig. 1 of the drawings, an alternator 1 is driven by a hydraulic motor 2 at a speed which will produce the desired output frequency. The electrical load 3 of the system is connected to absorb the output of the alternator. A constant flow device or flow limiter 4 is connected between the input line 7 of a source of high pressure hydraulic fluid or oil and the oil motor inlet. The motor outlet is connected to the oil return line 8. The flow limiter 4 is set to deliver sufficient oil to operate the alternator 1 at its nominal frequency. The flow limiter 4 will tend to minimize the effect of varying input oil pressure and varying load.

A hydraulic transfer valve 6 such as the one disclosed in U.S. Patent No. 2,767,689 to Moog is connected between the input line 7 of the source of hydraulic oil, the oil motor 2 and the return line 8. The return line of the valve is connected to the oil return line 8. This arrangement allows additional oil to be by-passed around the flow limiter to the motor input when the valve is opened in one direction. Opening the valve in the opposite direction will cause oil to be diverted from the oil motor input to the return line 8. When the valve is closed no oil will flow except that passed by the flow limiter 4. With this arrangement the hydraulic valve 6 acts as a vernier on the flow rate and thus will control the alternator speed. The hydraulic transfer valve 6 is operated by an electric current passed through the control coil 26. The polarity and amplitude of this current determines the direction and flow rate of the oil through the valve.

A resonant circuit discriminator 5 is connected to the output of the alternator 1. This discriminator 5 senses the frequency of the alternator 1, and develops a current in its output circuit which is a function of the frequency applied to the input. The output of the discriminator 5 is connected to the control coil 26 of the hydraulic transfer valve 6. Thus, changes in frequency result in an output current which actuates the valve. The valve in turn adjusts the oil flow to correct the alternator shaft speed and thus restores the desired frequency.

The frequency corrective action of the system described is approximately in proportion to the loop-gain. Thus, with a loop-gain of say 30, a perturbation that would cause a frequency error of say 15% would be reduced to approximately a 0.5% error when the loop was closed.

Since the system requires a high loop-gain for proper corrective action, an undesirable instability can exist if certain gain/phase relations occur. If the out of phase gain of the system exceeds unity at any frequency, there will be a tendency for the system to oscillate at approximately that frequency. This unfavorable phase condition is caused by a combination of the alternator inertia and the valve response time. To avoid this condition it is necessary to insert a filter which will reduce the gain of the loop before the phase shift reaches the critical value. This filter is most conveniently placed between the discriminator output and the valve coil.

Figure 2:
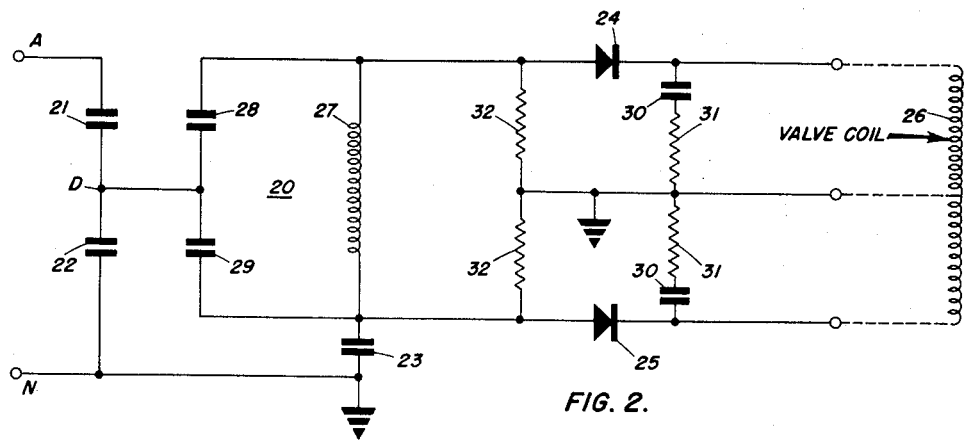
Fig. 2 is a schematic view of the discriminator and filter circuits.

Any discriminator circuit which will deliver sufficient power to operate the valve and has the correct sensitivity may be used. An example of a workable discriminator and filter circuit is shown in Fig. 2. This circuit was designed to operate with a power frequency of 400 c.p.s. The circuit includes two capacitors 21 and 22 which divide the 115 volt line voltage down to approximately 20 volts R.M.S. The tuned circuit 20 consists of two identical capacitors 28 and 29 connected in series across a 70 millihenry inductor 27. The resonant circuit 20 is tuned to 400 c.p.s. An unbalancing capacitor 23 is connected from one end of the tuned circuit 20 to ground. The function of the capacitor 23 is to cause a circulating current to flow in the tuned circuit 20. This circuit configuration results in a voltage across the capacitors 28 and 29 which at 400 c.p.s. is shifted 90° from the voltage which appears between the center tap of these capacitors and ground. Thus, the voltage at the input of rectifier 24 is the vector sum of the voltage across capacitors 22 and 28. The voltage at the input of rectifier 25 is the vector sum of the voltage across capacitors 22 and 29. At tuned or center frequency these two voltages are equal in value. As the frequency of the applied power is raised, the phase of the voltage across capacitors 28 and 29 will lag. The vector sum of the voltage at the input of one diode will rise and the voltage at the other diode will fall. If the frequency is lowered instead the reverse reaction will take place. The rectifiers 24 and 25 will develop a D.C. voltage which will correspond to the level of A.C. voltage at their input. A D.C. current will flow through each half of the valve coil and back to ground through the center tap of the coil. Thus, equal and opposite currents will flow in the coil at center frequency. The effect of these currents is to cancel each other. Changing the input frequency will cause an unbalance in the valve currents and therefore operate the valve 6. The resistors 32 are connected to provide a return circuit for the D.C. current flowing in the valve. The capacitors 30 and series resistors 31 provide the filtering action necessary to correct the gain/phase characteristic described above. These capacitors also act as storage elements for the half wave rectifiers 24 and 25.

The discriminator and filter circuit shown in Fig. 2 and described above will deliver a differential current with a slope of 0.35 milliampere per cycle for +10 c.p.s. A maximum output of approximately 5 milliamperes will be achieved at ±20 c.p.s. The filter shown reduces the loop gain at the rate of 6 db per octave with the corner at 0.25 c.p.s.

A complete system employing the above discriminator and filter was assembled and tested. The input line pressure was adjusted to 1700 p.s.i. and the alternator loaded with 1 kw. of resistive load. Under these conditions the motor input pressure was 1280 p.s.i. and the alternator speed 12,300 r.p.m. The oil consumption was 3.7 g.p.m. The loop gain was measured and found to be 30.

The system was tested by varying the supply pressure from 1400 p.s.i. to 2000 p.s.i. Under these conditions the frequency of the alternator held to within 0.5% of the 400 c.p.s. value. The electrical load was varied from 700 watts to 1300 watts and again the frequency varied less than 0.5%. When the electrical load was switched, a frequency transient of 2.5% lasting for 0.1 second was observed. When the hydraulic pressure was abruptly changed, no transient greater than the 0.5% static frequency change was observed. Thus, the superior stability of this type of frequency control was demonstrated in a practical case.

Obviously, many modifications and variations of the present invention are possible in the light of the above teachings. It is therefore to be understood that within the scope of the appended claims the invention may be practiced otherwise than as specifically described.

What is claimed is:

1. In an electrical power supply comprising a source of hydraulic fluid, a hydraulic motor driven by said source, an alternator driven by said motor, a flow limiter connected between said source and said motor to control the flow of fluid to said motor, a frequency sensitive discriminator being responsive to changes in frequency of said alternator, and an electro-hydraulic transfer valve connected across said limiter and across said motor and being operated by said discriminator for changing the amount of fluid flow to said motor, whereby the frequency of the alternator can be controlled to compensate for changes in load, supply pressure and environment.

2. In an electrical power supply comprising a source of hydraulic oil, a flow limiter to control the flow of oil, a rotary alternator, a positive displacement oil motor driving said rotary alternator, an electro-hydraulic transfer valve, a resonant circuit discriminator with an input connected to said alternator and an output connected to said valve, said valve driven by the output of said discriminator and connected to said source across said limiter and from said limiter across said motor to control the flow of oil to the oil motor by increasing or decreasing the amount of oil fed by the flow limiter, whereby the frequency of the alternator is precisely controlled to compensate for changes in electrical load, supply pressure, and environment.

3. In combination with a hydraulic motor, an alternator driven by the motor, a closed circuit fluid source for the motor, and a flow limiter connected with the motor and the fluid source; a frequency control system including an electrically operated transfer valve connected from said source across said flow limiter, and from said limiter across said motor to said source, and a frequency sensitive discriminator connected between the valve and the alternator and being responsive to changes in the frequency of the alternator output, the output of said discriminator being applied to said transfer valve, whereby fluid flow to the motor for maintaining said motor at constant speed may be controlled.

4. In a power supply including an alternator, a hydraulic motor with inlet and outlet for driving the alternator, a closed circuit high pressure fluid source with fluid input and fluid return for driving the motor and a flow limiter connected between the fluid input from the source and the inlet of the motor; an alternator frequency control system comprising, an electrically operated transfer valve connected to the fluid input from the source, the inlet of the motor and the fluid return to the source, and a frequency sensitive discriminator connected between said valve and the alternator and being responsive to changes in the frequency of the alternator output, the output of said discriminator being applied to operate said valve, the output of said discriminator controlling said valve and determining the amount of fluid flow to the motor for maintaining the motor at constant speed, whereby the shaft speed of the alternator is substantially constant irrespective of changes in fluid pressure and alternator load.

5. In a system for controlling the output frequency of an A.C. power supply including an alternator, a fluid motor with fluid input and fluid output for driving the alternator, and a source of high pressure fluid with input and return lines connected thereto for driving the motor; a flow limiter connected between the input line and the motor fluid input, an electrically operated valve connected between the input line, the motor, fluid input and the return line, said valve having a coil, and a discriminator connected between the alternator and said valve coil and being responsive to changes in the alternator voltage output, said discriminator having a resonant circuit and rectifying elements, said resonant circuit being tuned to the normal frequency of the output of the alternator, said rectifying elements connected to said resonant circuit, said resonant circuit generating an unbalanced signal to the rectifying elements under variations of the frequency of the alternator output from the normal frequency, said unbalanced signal causing an unbalanced current through the valve coil, the amount and polarity of the unbalanced output current of said discriminator through said valve coil controlling said valve and determining the amount of fluid flow to the motor for maintaining the motor at constant speed, whereby the shaft speed of the alternator is substantially constant irrespective of changes in fluid pressure and alternator load.

6. In an alternating current power supply comprising a source of hydraulic oil, a flow limiter to control the flow of oil and minimize the effect of hydraulic transients, a rotary alternator, a positive displacement oil motor driving said rotary alternator, said limiter connected to said source and said motor, a filter circuit, a resonant circuit discriminator having a tuned LC circuit, two rectifiers to develop an error voltage, an input connected to said alternator and an output connected to said filter circuit, said filter circuit correcting the gain/phase relationship in the servo loop, and an electro-hydraulic transfer valve driven by the output of said filter, whereby the differential output of the discriminator will operate the valve, said valve being connected across said limiter and across said motor, whereby the opening of the valve in one direction will cause additional oil to flow to supplement the output of the flow limiter and the opening of the valve in the opposite direction will divert some of the oil from the flow limiter to the source whereby the frequency of the alternator is precisely controlled to compensate for changes in load, supply pressure, and environment and the terminal voltage of the alternator will be stabilized against these changes by maintaining the alternator shaft speed substantially constant.

7. In an alternating current power supply comprising a source of hydraulic oil, a flow limiter to control the flow of oil and minimize the effect of hydraulic transients, a rotary alternator, a positive displacement oil motor driving said rotary alternator, said limiter connected to said source and said motor, an electro-hydraulic transfer valve and a resonant circuit discriminator having a tuned LC circuit, two rectifiers to develop an error voltage, an input connected to said alternator and an output connected to said valve, said valve being driven by the output of said discriminator whereby the differential output of the discriminator will operate the valve, said valve being connected across said limiter and across said motor, whereby the opening of the valve in one direction will cause additional oil to flow to supplement the output of the flow limiter and the opening of the valve in the opposite direction will divert some of the oil from the flow limiter to the source such that the frequency of the alternator is precisely controlled to compensate for changes in load, supply pressure, and environment and the terminal voltage of the alternator will be stabilized against these changes by maintaining the alternator shaft speed substantially constant.

References Cited in the file of this patent

UNITED STATES PATENTS

| | | |
|---|---|---|
| 2,004,522 | Douglas | June 11, 1935 |
| 2,349,334 | Armentrout | May 23, 1944 |
| 2,354,634 | Griswold | July 25, 1944 |
| 2,500,655 | Bevins et al. | Mar. 14, 1950 |
| 2,558,729 | Buechler | July 3, 1951 |
| 2,635,428 | Marsh et al. | Apr. 21, 1953 |
| 2,775,724 | Clark | Dec. 25, 1956 |
| 2,780,733 | Chyba | Feb. 5, 1957 |
| 2,850,869 | Foster | Sept. 9, 1958 |